US008178830B2

(12) United States Patent
Condon et al.

(10) Patent No.: US 8,178,830 B2
(45) Date of Patent: May 15, 2012

(54) OPTICAL PRESSURE SWITCH, DOOR OPERATING SYSTEM AND METHOD

(75) Inventors: James E. Condon, Plymouth, CA (US); Clare M. Condon, legal representative, Plymouth, CA (US); Gregory S. Beck, Hanford, CA (US)

(73) Assignee: JEC Optics, Inc., Placerville, CA (US)

( * ) Notice: Subject to any disclaimer, the term of this patent is extended or adjusted under 35 U.S.C. 154(b) by 775 days.

(21) Appl. No.: 12/224,025

(22) PCT Filed: Feb. 17, 2006

(86) PCT No.: PCT/US2006/005650

§ 371 (c)(1), (2), (4) Date: Aug. 14, 2008

(87) PCT Pub. No.: WO2007/106061

PCT Pub. Date: Sep. 20, 2007

(65) Prior Publication Data

US 2010/0154311 A1 Jun. 24, 2010

(51) Int. Cl.
*G01D 5/34* (2006.01)
*H01H 35/24* (2006.01)

(52) U.S. Cl. ................................ 250/231.19; 200/83 R

(58) Field of Classification Search .................. 250/221, 250/222.1, 231.1, 231.19; 200/81.4, 81 R, 200/83 R, 83 S, 83 SA, 83 A, 83 B, 83 J See application file for complete search history.

(56) References Cited

U.S. PATENT DOCUMENTS 3,491,246 A * 1/1970 Doda et al. ............... 250/231.19
3,916,567 A 11/1975 Daugirdis
4,004,272 A 1/1977 Claxton
4,035,637 A 7/1977 Lenhart
4,049,964 A 9/1977 Wuchinich
4,122,337 A 10/1978 Okuda
4,133,345 A 1/1979 Mitchel
4,211,901 A 7/1980 Matsada
4,320,294 A 3/1982 Everett
4,322,979 A 4/1982 Fromm
4,369,344 A 1/1983 Diamond
4,371,762 A 2/1983 Diamond
4,479,111 A 10/1984 Madsen
4,521,683 A * 6/1985 Miller ........................... 250/221
4,604,633 A 8/1986 Kimura
4,620,072 A 10/1986 Miller
4,626,680 A 12/1986 Martens
4,626,681 A 12/1986 Hays (Continued)

OTHER PUBLICATIONS

PC/US2006/005650, Sep. 20, 2007, Condon, WO/2007/106061 Written Opinion of the Intl. Search Authority.

*Primary Examiner* — John Lee

(74) *Attorney, Agent, or Firm* — John J. Connors; Connors & Assoc. pc

(57) ABSTRACT

A door having a pneumatic sensing edge is operated automatically to open when an object and the edge make contact An optical pressure switch (10) in fluid communication with gas forced from the edge on contact with the object initiates the operation of a door opener The optical pressure switch (10) includes a membrane (16) having a portion that interrupts a light beam (LB) when the membrane (16) flexes due to the increase gas pressure over ambient pressure as gas is forced from the edge.

15 Claims, 7 Drawing Sheets

U.S. PATENT DOCUMENTS

| | | | | | |
|---|---|---|---|---|---|
| 4,628,740 | A | * | 12/1986 | Ueda et al. | 73/705 |
| 4,698,967 | A | | 10/1987 | Longora | |
| 4,745,925 | A | | 5/1988 | Dictz | |
| 4,868,384 | A | | 9/1989 | Franked | |
| 4,899,046 | A | | 2/1990 | Wright | |
| 4,911,015 | A | | 3/1990 | Miller | |
| 4,977,413 | A | | 12/1990 | Yomanaka | |
| 5,130,502 | A | | 7/1992 | Chen | |
| 5,130,503 | A | | 7/1992 | Heiress | |
| 5,148,631 | A | | 9/1992 | Bayard | |
| 5,203,110 | A | | 4/1993 | Horman | |
| 5,252,826 | A | * | 10/1993 | Kemp | 250/231.19 |
| 5,262,641 | A | * | 11/1993 | Kemp | 250/231.19 |
| 5,280,754 | A | | 1/1994 | Flanagon | |
| 5,426,293 | A | | 6/1995 | Miller | |
| 5,725,359 | A | | 3/1998 | Dongo | |
| 6,040,536 | A | | 3/2000 | Miller | |
| 6,904,192 | B2 | | 6/2005 | Schroeder | |
| 2005/0258342 | A1 | * | 11/2005 | Egermeier et al. | 250/215 |
| 2010/0154311 | A1 | * | 6/2010 | Condon et al. | 49/358 |

* cited by examiner

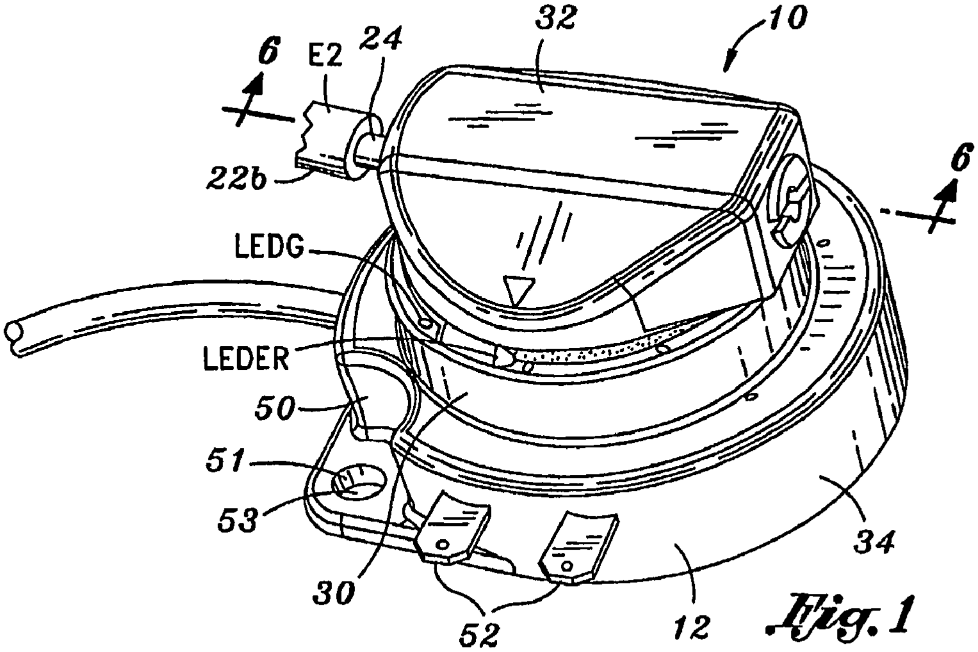
*Fig. 1*
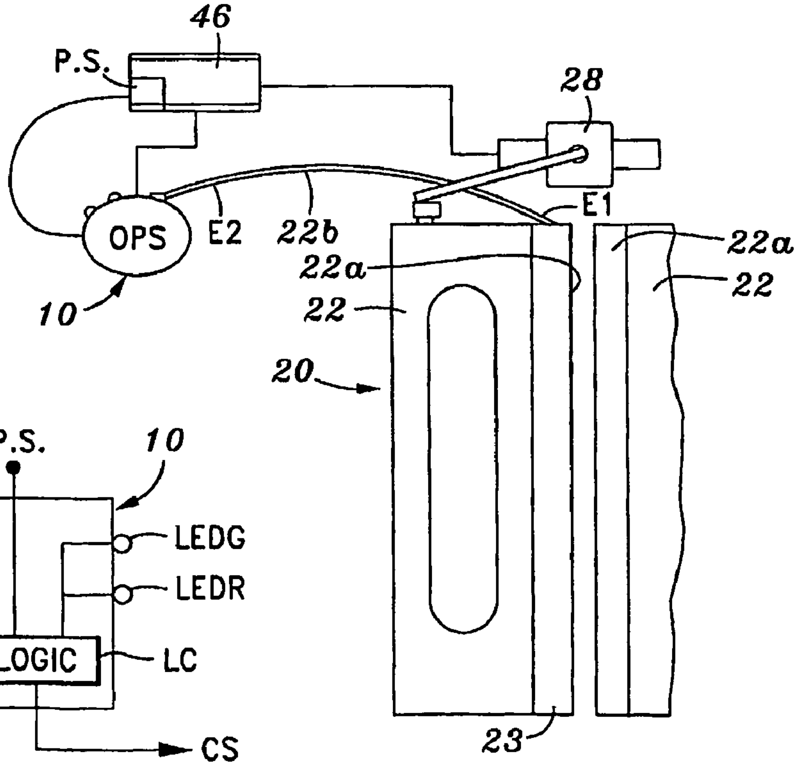
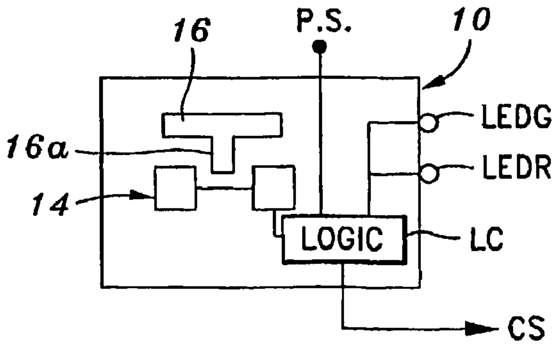
*Fig. 1B*
*Fig. 1A*

OPTICAL PRESSURE SWITCH, DOOR OPERATING SYSTEM AND METHOD

INCORPORATION BY REFERENCE

The inventors incorporate herein by reference any and all U.S. patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

Automatic door operating systems are commonly used in vehicles such as passenger transit buses and rail cars, for example. The door or doors of such systems have a pneumatic sensing edge connected by a gas conduit or hose to a pressure wave switch included in an electrical control circuit for the door operating system. When the sensing edge makes momentary contact with an object on closure of the door, a pressure pulse or wave is produced that propagates through the gas conduit to actuate the switch. The switch then provides a control signal energizing an operator of a door opening mechanism to open the door automatically.

Mechanical pressure wave switches are currently being used for passenger door obstruction sensing. Such conventional mechanical pressure wave switches typically use two mechanical metallic contacts that are subject to oxidation and other environmental contamination that can reduce the reliability or sensitivity of the switches, as well as creating a failure condition. The mechanical contact components of mechanical pressure wave switches have no self-cleaning capabilities such as contact wiping. Moreover, the mechanical contacts pass very low current (approximately 12-18 milliamps) which is not enough to keep these mechanical contacts clean.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to providing: an optical pressure wave switch having greater stability and reliability under environmental contaminating conditions; an optical pressure wave switch that is easy to calibrate or re-calibrate; an optical pressure wave switch that is less sensitive to environmental contamination, and therefore, will remain calibrated longer creating a longer life; and an optical pressure wave switch that is electronic rather than a mechanical type, and optionally, may have the ability for self annunciation for purposes of diagnostic testing.

Without limiting the scope of this invention as expressed by the claims that follow, some, but not necessarily all, of its features are:

One, the optical pressure switch of this invention includes a body having a passageway therein, a flexible membrane in fluid communication with the passageway, and an optically activated control device having a light beam projected along an optical path within the body. The light beam is interrupted upon the membrane flexing.

Two, the membrane may comprise an elastic diaphragm having a perimeter in a fixed position and a central portion from which an elongated portion extends that moves into the path of the light beam when the membrane flexes. The elastic diaphragm may be a rubbery sheet material and be circular and disk shaped. The elongated portion may be integral with the membrane and comprise a stem element projecting outward from a side of the membrane substantially at a right angle prior to the membrane flexing. There may be a guide member within the body aligned with the stem element to guide the stem element as it moves in response to the flexing of the membrane. For example, the guide member may comprise a tubular structure in which the stem element is seated.

Three, the body may comprises a plurality of components. For example, the components may be molded of plastic. In one embodiment of this invention, one component may include the passageway which has an inlet into which enters the pressure wave. This wave, being at a pressure above ambient pressure to flex the membrane, propagates along the passageway, exiting at an outlet of the passageway. Although referred to as an inlet and outlet, the inlet and outlet function as ports that allow air to flow in both directions. As discussed subsequently in greater detail, this enables the door operating system of this invention to be self-equilibrating.

Four, the components are assembled to create at least two chambers with the membrane providing a common wall for the chambers. The chambers normally are each at ambient pressure, however, the membrane flexes when there is a differential in pressure across the membrane as a pressure wave propagates through the switch. The membrane returns to an un-flexed condition when the differential in pressure is removed as the pressure wave dissipates. In other words, the pressure across the membrane is equalized. For example, one chamber may include a port normally in communication with ambient pressure but also in fluid communication with a pneumatic sensing edge.

Five, in one embodiment of this invention, one chamber includes the optically activated control device and is open to ambient pressure through a restricted opening that substantially reduces contamination of the optically activated control device that would interfere with the functioning of the light beam. This chamber is substantially closed to the atmosphere and houses or encloses essentially the entire optically activated control device, or at least the optical elements of the device. This protects the optical elements to reduce significantly environmental contamination.

Six, the components may be connected together in a manner that enables one component to be moved relative to the other component to adjust the distance the elongated portion must move before it interrupts the light beam. This feature enables the pressure switch to be calibrated. After calibration the components are fixedly connected together, for example, using a removable adhesive that is applied in a manner to maintain the two components fixedly connected together until the adhesive is removed.

Seven, the switch may have a control circuit and a first light-emitting device mounted on the exterior of the body that indicates when power is applied to the control circuit and a second light-emitting device mounted on the exterior of the body that indicates when pressurized gas flows into the switch. These light-emitting devices are used for testing of the switch as discussed subsequently.

In one embodiment, the body has a longitudinal reference line has first, second, and third housing components. The first housing component includes a threaded surface, and the second housing component includes a threaded surface. The third housing component includes the optically activated control device. The optical path intersects the longitudinal reference line. The first housing component is disposed between the second and third housing components. The membrane is a flexible and resilient circular disk having a circular perimeter and a center that the longitudinal reference line intersects. The disk is positioned between the first and second housing components to form within the first housing component a first chamber and within the second housing component a second chamber with the membrane providing a common wall for the chambers. A portion of the disk moves a predetermined distance into the optical path when the membrane flexes. Opposed sides of the membrane are each normally at ambient pressure so the membrane is in an un-flexed condition prior to the pressure wave entering one chamber.

This invention also includes a door operating system. This system includes a door mounted to open and close and having a pneumatic sensing edge holding a gas and the optical pressure switch discussed above in fluid communication with the gas so the switch is activated when it receives a pressure wave from the edge. Activation of the switch provides an operational control signal to operate a door opener mechanism. According to this feature, the pneumatic sensing edge upon connection to the switch is placed in fluid communication with ambient pressure and concurrently one side of the membrane, which normally has both its sides at ambient pressure. When the pressure wave propagates through the switch, the membrane flexes, but only momentarily. Shortly after the pressure wave dissipates, both the pressure within the edge and the pressures on both sides of the membrane are at ambient pressure because they are always in fluid communication with the atmosphere. Ambient pressure, however, constantly changes due to changing weather and the vehicle traveling to different elevations. Nevertheless, the door operating system of this invention self-equilibrates to readjust continually and compensate for changing ambient pressure. Consequently, the edge and the switch are always at ambient pressure except when the edge contacts an object or is squeezed during testing as discussed subsequently.

These features are not listed in any rank order nor is this list intended to be exhaustive.

This invention also includes a method of diagnosing problems with a door operating system. The embodiment of this invention that employs a light-emitting device is especially designed to be self-annunciating because it provides light signals indicating problems. A technician squeezes and holds the door sensing edge and the light-emitting device is illuminated. After a brief time period the light is automatically discontinued when the pressure differential across the membrane equalizes.

DESCRIPTION OF THE DRAWING

Some embodiments of this invention, illustrating all its features, will now be discussed in detail. These embodiments depict the novel and non-obvious optical pressure switch, door operating system, and method of this invention as shown in the accompanying drawing, which is for illustrative purposes only. This drawing includes the following figures (Figs.), with like numerals indicating like parts:

FIG. 1 is a perspective view looking at the front side of the optical pressure switch of this invention.

FIG. 1A is a schematic diagram of a door operating system of this invention using the optical pressure switch shown in FIG. 1.

FIG. 1B is a schematic diagram of optical pressure switch shown in FIG. 1.

DETAILED DESCRIPTION OF SOME EMBODIMENTS OF THIS INVENTION

FIGS. 1 T*hrough* 7

Figure 2:
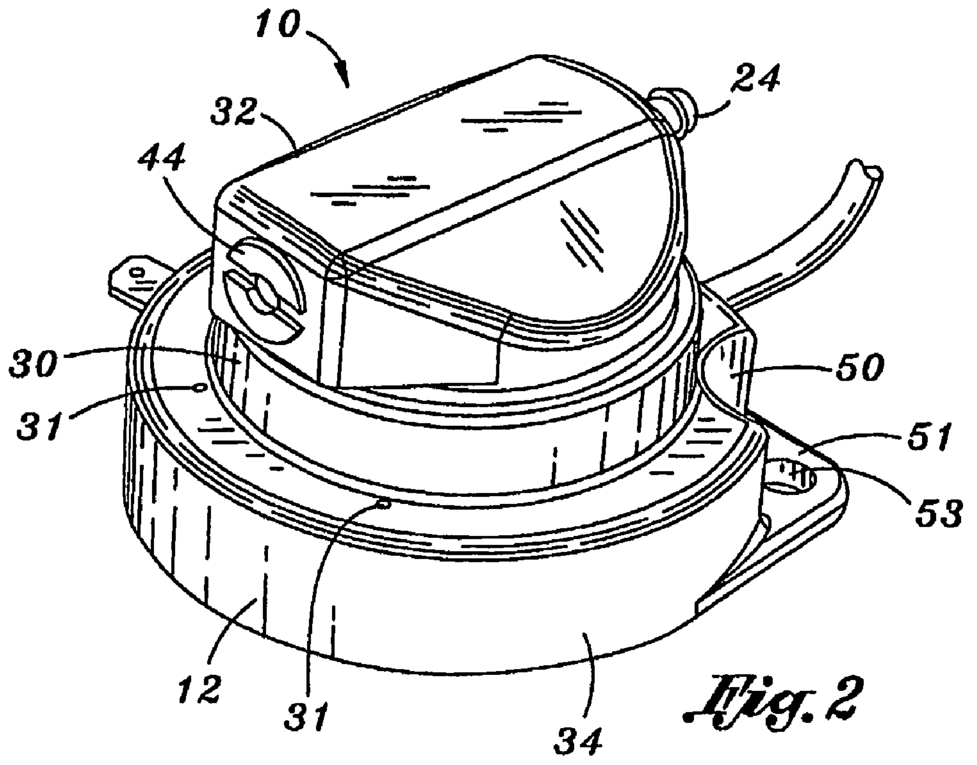
FIG. 2 is a perspective view looking at an outlet side of the optical pressure switch shown in FIG. 1.
Figure 3:
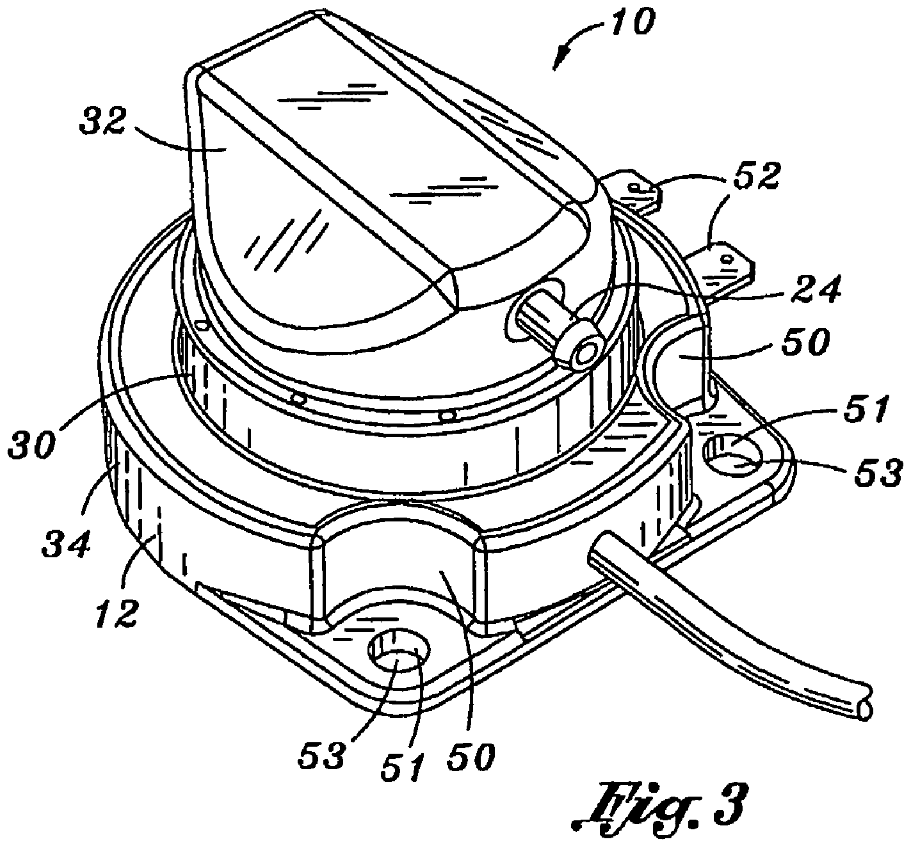
FIG. 3 is a perspective view looking at an inlet side of the optical pressure switch shown in FIG. 1.

As illustrated in FIGS. 1 through 7, one embodiment of the optical pressure switch of this invention designated by the numeral 10 comprises a body 12, an optically activated control device 14 (FIG. 7), and a membrane 16 (FIGS. 4, 5 and 6) within the body. A suitable optically activated control device 14 may be purchased from Bircher, distributed through JMT Automation and Controls, Inc., of Gastonia, N.C. When pressurized gas flows as a pressure wave through a passageway 18 (FIG. 6) in the body 12, the membrane 16 flexes. An elongated portion 16*a* extending from one side S1 (FIG. 5) of the membrane 16 moves a predetermined distance, typically substantially from 0.02 to 0.12 inch, to interrupt a light beam LB (FIG. 1B) in the optically activated control device 14 when the membrane 16 flexes in response to the pressure wave. As discussed subsequently in greater detail, the optical pressure switch 10 is calibrated to respond to gas pressures substantially from 0.01 to 0.16 pounds per square inch (psi).

The optical pressure switch 10 may be utilized advantageously in a door operating system 20 such as depicted in FIG. 1A. The door operating system 20 is commonly employed in vehicles or other structures that require a door or doors 22 to open automatically when, for example, a passenger's hand, or other object, contacts the door, thereby avoiding accidents and injuries. The door 22 is mounted to open and close and has a pneumatic sensing edge 22*a* holding a gas, typically air at ambient pressure. The pneumatic sensing edge 22*a* is a well-known device comprising a balloon like, resilient vessel 23 having a hose 22*b* with one end E1 in fluid communication with the gas in the vessel and its other end E2 (FIGS. 1 and 6) connected to an inlet 24 of the optical pressure switch 10. The resilient vessel 23, upon being compressed when the edge 22*a* contacts an object, forces gas to flow at a predetermined pressure to flow as a pressure wave from the vessel 23 through the hose 22*b* and into the switch 10 to flex the membrane 16 and move the elongated portion 16*a* into the optical path of the light beam LB. This actuates the switch 10 that provides a control signal CS (FIG. 1B) to a conventional door opener mechanism 28. The door opener mechanism 28 opens in response to the control signal CS.

Figure 4:
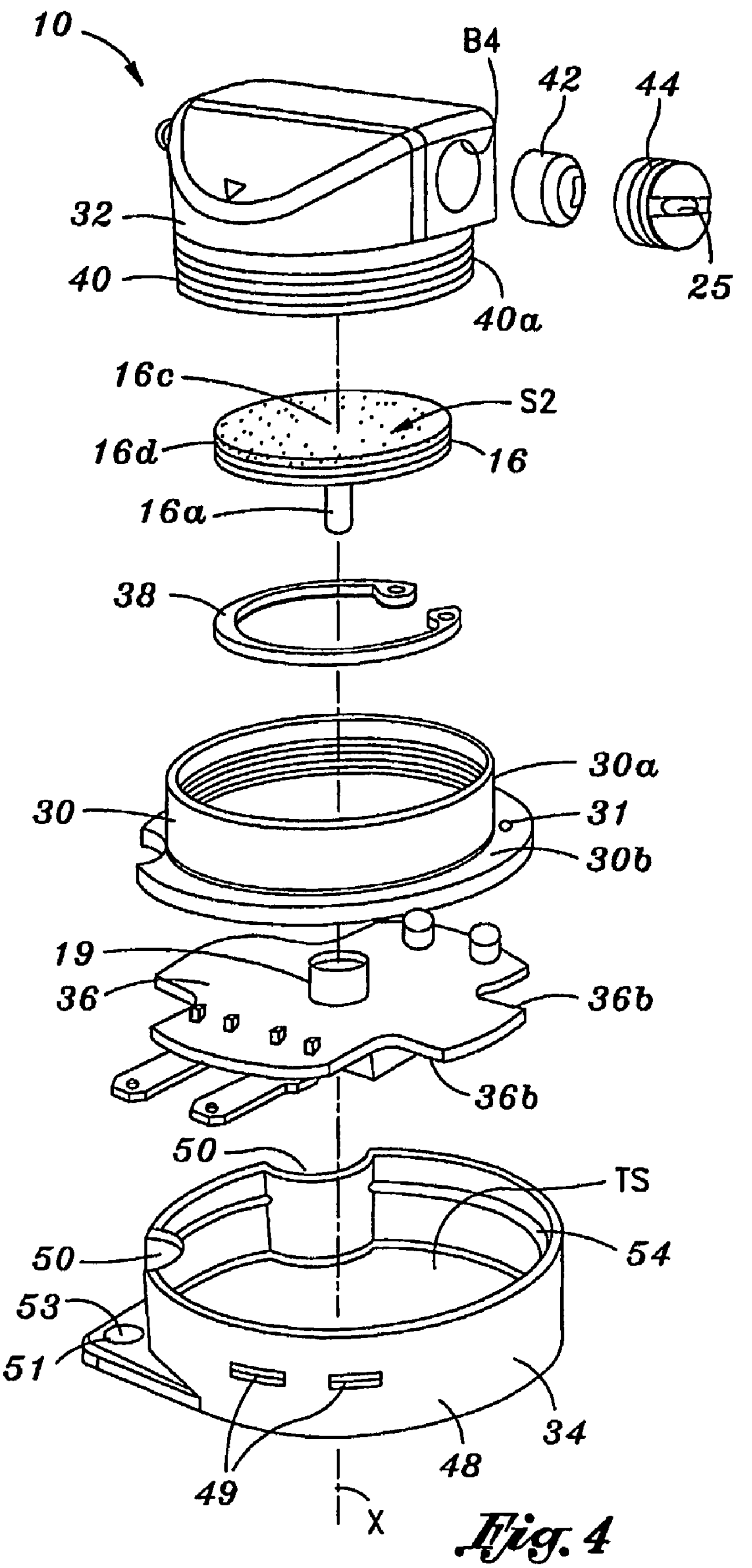
FIG. 4 is an exploded perspective view of the optical pressure switch shown in FIG. 1 looking at the top of the switch.
Figure 5:
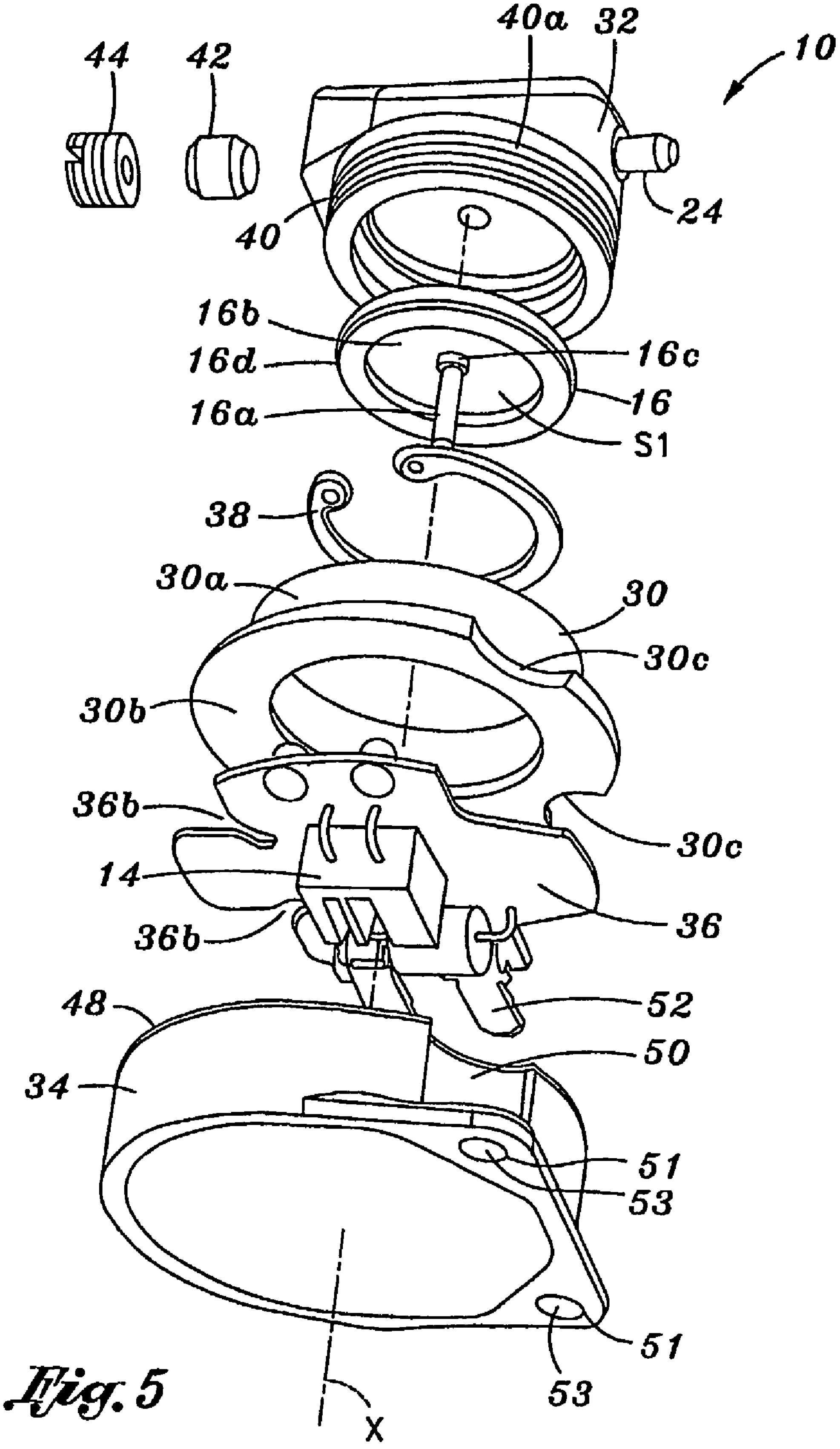
FIG. 5 is an exploded perspective view of the optical pressure switch shown in FIG. 1 looking at the bottom of the switch.
Figure 6:
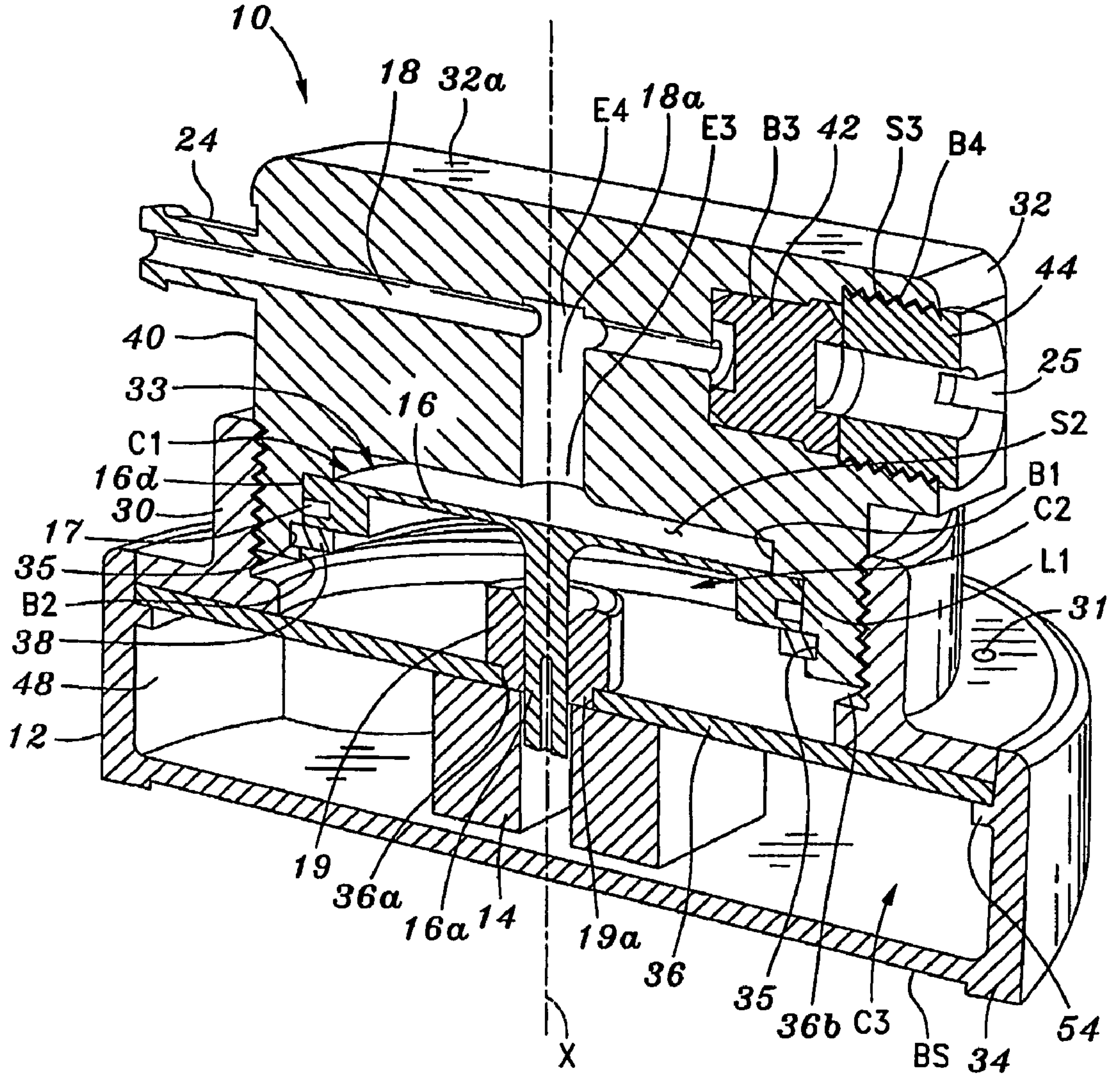
FIG. 6 is a cross-sectional view taken along line 6-6 of FIG. 1.

As best shown in FIGS. 4, 5 and 6, the membrane 16 is an elastic diaphragm made of rubber or other suitable material and may be a circular disk having a recessed central portion 16*b* (FIG. 5) and a center 16*c* that a longitudinal reference line X intersects at a right angle upon mounting the disk in the body 12. The central portion 16*b* is substantially flat and planar when not flexed. Although it is flexible and resilient, the central portion 16*b* maintains a substantially flat condition until a greater pressure is applied to the side S2 (FIG. 6) than to the side S1. The perimeter 16*d* of the membrane 16 may include a stiffening ring 17. The elongated portion 16*a* is formed during molding of the membrane 16 and is integral therewith. It may be in the form of a substantially rigid, elongated stem of sufficient length to extend through a tubular guide member 19 into the optical path of the light beam LB when the membrane 16 is flexed. The elongated portion 16*a* is substantially at a right angle to the side S1 prior to the membrane 16 flexing. For most applications the membrane 16 is designed so the elongated portion 16*a* moves only a short distance to interrupt the light beam LB (FIG. 1B). Typically, this distance ranges substantially from 0.02 to 0.12 inch and is adjusted during calibration as discussed subsequently.

As depicted in FIGS. 4, 5 and 6, the body 12 includes a plurality of housing components 30, 32, and 34. The housing component 30 is disposed between the housing components 32 and 34. These housing components 30, 32 and 34 each have a generally hollow cylindrical portion with predetermined diameters enabling them to be nested together with the longitudinal reference line X being co-extensive with the axes of these cylindrical portions. The housing components 30, 32, and 34 may be molded from a plastic material such as, for example, ABS resin, and are connected together upon assembly to form three chambers C1, C2, and C3 as depicted in FIG. 6. The membrane 16 provides a common wall for the chambers C1 and C2.

The housing component 30 has a cylindrical wall 30*a* open at opposed ends with a threaded interior surface and an annular rim 30*b* at a right angle to the wall. A pair of spaced apart cut-a-way sections 30*c* (FIG. 5) are formed in the rim 30*b*. There are a number of openings 31 passing through the rim 30*b* that, upon assembly of the components 30, 32 and 34, place the chambers C2 and C3 in communication with ambient air pressure as discussed subsequently in greater detail.

The housing component 32 has an upper block segment 32*a* that includes an outlet 25. Opposed to the inlet 24 is an enlarged, stepped, cylindrical recess created by aligned bores B3 and B4 as depicted in FIG. 6. The bore B4 has a diameter slightly larger than the bore B3 and its internal surface S3 is threaded. A flow control member 42 and a threaded tubular cap 44 are seated in the stepped recess with the flow control member in the bore B3 and the cap threaded into the bore B4 to hold the flow control member in position. The flow control member 42 impedes gas flow through the passageway 18 so back pressure is created within the passageway when the pressure wave enters the passageway. The flow control member 42 may comprise a porous plug with a plurality of torturous paths therein. This flow control member 42 also serves as a filter to eliminate particulate contaminates from air flowing into the chamber C1 through this flow control member. A suitable flow control member 42 in the form of a porous plug may be purchased from Applied Porous Technologies, Inc. The threaded tubular cap 44 is hollow to provide the outlet 25.

The inlet 24, which is integral with the block segment 32*a*, is in the form of a tubular member projecting from the block segment 32*a* and may be directly opposite and aligned with the outlet 25. The passageway 18 connects the inlet 24 and the outlet 25 so gas may flow into the inlet, through the passageway, and out the outlet 25. Under some conditions as discussed subsequently, gas may flow into the chamber C1 through the outlet 25. Between the inlet 24 and outlet 25 is a branch passageway 18*a* extending along the longitudinal reference line X. This branch passageway 18*a* has an open end E3 (FIG. 6) terminating in the chamber C1. The branch passageway 18*a* merges at another end E4 about mid-way between the inlet 24 and the outlet 25 to provide a generally T-shape configuration. Pressurized gas will flow from the open end E3 when the pneumatic sensing edge 22*a* contacts an object to produce a pressure wave that is at a pressure above ambient pressure.

A cylindrical wall 40 projects from an underside of the block segment 32*a* that has a threaded exterior surface 40*a*. A stepped cavity 33 (FIG. 6) within the housing component 32 is formed by cylindrical bores B1 and B2, aligned so their axes are coextensive with the longitudinal reference line X. The bore B1 has a diameter smaller than the bore B2, thereby forming a landing L1 on which rests the perimeter 16*d* of the membrane 16. Along the wall of the bore B2 is an annular groove 35 at a right angle to the longitudinal reference line X. The distance between the top of the groove 35 and the landing L1 is approximately equal to the thickness of the perimeter 16*d* of the membrane 16. The diameter of the groove 35 is greater than the diameter of the membrane 16 and a C-ring 38 is snapped into the groove 35 to hold the perimeter 16*d* of the membrane 16 snug against the landing L1 in a fixed position, maintaining the membrane within the chamber C2 with the elongated stem portion 16*a* aligned with the longitudinal reference line X and extending into the chamber C3.

Figure 7:
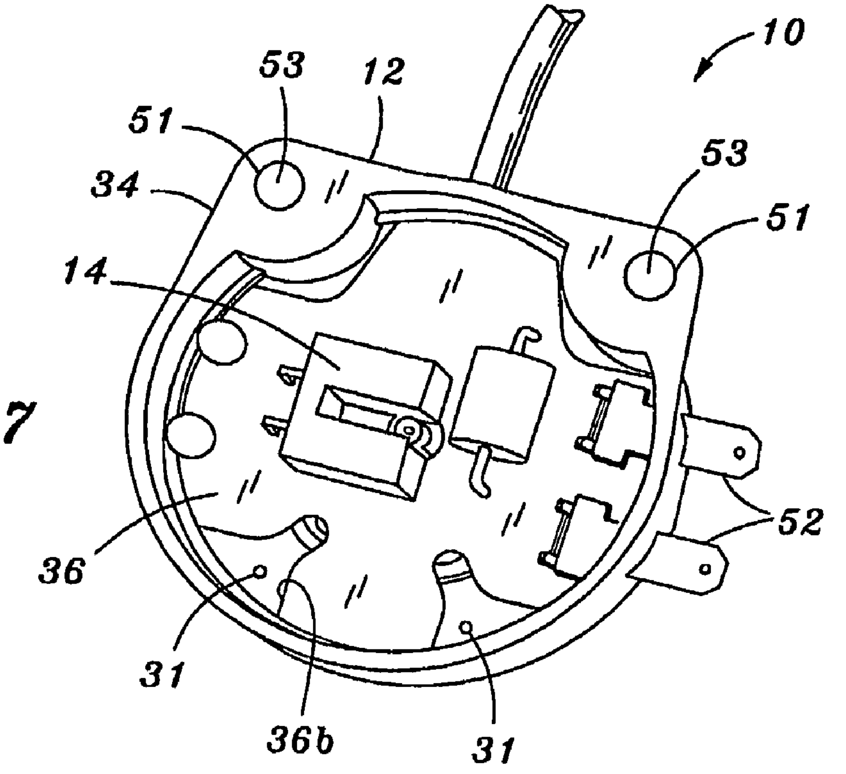
FIG. 7 is a perspective view of the optical pressure switch shown in FIG. 1 with its the bottom side removed.

As best shown in FIG. 7, the housing component 34 holds a substantially flat circuit board 36 on which is mounted the optically activated control device 14 and other electrical and electronic devices of a control circuit 46 (FIG. 1A). As best shown in FIG. 7, a pair of cut-a-away sections 36*b* of the circuit board 36 are aligned with the openings 31 to place the chambers C2 and C3 in fluid communication with ambient air pressure. Note, an inner portion of each of the cut-a-away sections 36*b* extends inward to create access openings placing the chamber C3 in fluid communication with chamber C2. The housing component 34 includes a cylindrical wall 48 open at its circular topside TS and preferably closed at its bottom side BS. (The dosed bottom side is shown removed in FIG. 7). The cylindrical wall 48 has a pair of slits 49 therein (FIG. 4) and a pair of spaced apart indentations 50, each terminating as a base landing 51 integral with the wall's bottom side BS. Each base landing 51 includes a hole 53 through which a screw (not shown) passes when mounting the switch 10. The interior of the cylindrical wall has an annular ledge 54 (FIG. 4) near the open topside TS upon which the circuit board 36 rests when the housing components 30, 32 and 34 are assembled. Conductive metal prongs 52 extend outward from an edge of the circuit board 36. The circuit board 36 provides a common wall for the chambers C2 and C3. The tubular guide member 19 has a reduced diameter end 19*a* (FIG. 6) that fits snugly into a central hole 36*a* in the circuit board 36.

As depicted in FIGS. 1 and 1B, the optical pressure switch 10 may have visual indicators such as light emitting diodes (LED), for example, a green light emitting diode LED G and a red light emitting diode LED R used to diagnose problems with the switch 10 or the door operating system 20. The indicator LED R when lit indicates that power is being applied to the switch, and the indicator LED G when lit indicates that pressurized gas is flowing into the switch 10. The indicators LED G and LED R are mounted on the exterior of the body 12.

Assembly and Calibration

The parts of the optical pressure switch 10 are assembled in a conventional manner. The circuit board 36 with its components mounted thereon may first be positioned in the housing component 34 with the prongs 52 extending through the slits 49 and the circuit board resting on the ledge 54. The surface of the circuit board 36 to which the electrical and electronic components are mounted faces the chamber C3 so these electrical and electronic components, including the optically activated control device 14, are in the chamber C3. The diameter of the rim 30*b* is substantially equal to the diameter of the topside TS of the housing component 34. The housing component 30 is next placed on top of the circuit board 36 with its rim 30*b* resting on the top of the circuit board. The diameter of the rim 30*b* is substantially equal to the inside diameter of the housing component 34. Next, the housing component 30 is connected to the housing component 32 with membrane 16 and the flow control member 42 and threaded cap 44 attached thereto as discussed above.

Initially the membrane 16 is in an un-flexed condition, and the pressure on both sides S1 and S2 of the membrane is the same, i.e., ambient pressure. This is a state of equilibrium. When the pneumatic sensing edge 22*a* contacts an object, air is forced to propagate along the passageway 18 and the branch passageway 18*a* as a pressure wave above ambient pressure, causing the membrane 16 to flex to move the elongated portion 16*a* a selected distance to interrupt the light beam LB of the optically activated control device 14. This provides the control signal CS to which the door opener mechanism 28 responds to open the door 22. The air pressure across the membrane 16 subsequently rapidly equalizes because the pressure wave dissipates due to air escaping from chamber C1 through the outlet 25. Consequently, the elastic membrane 16 again returns to its un-flexed condition almost immediately after the pressure wave actuates the switch 10, thereby withdrawing the elongated portion 16*a* from the control device 14, moving the same selected distance it moved to interrupt the light beam LB but in the opposite direction. The light beam is now uninterrupted by the elongated portion 16*a*. In the un-flexed condition the membrane 16 is substantially at a right angle to the longitudinal reference line X.

As mentioned above, the optical pressure switch 10 is calibrated prior to being used in the door operating system 20 by adjusting the distance the elongated portion 16*a* moves in order to interrupt the light beam LB. This adjustment is made by screwing the threaded surfaces of the housing components 30 and 32 together, rotating these housing components until the outer tip of the elongated portion 16*a* passes through the tubular guide member 19 and is positioned next to the light beam LB at the selected distance. This distance depends on whether the user desires the membrane 16 to flex greatly before the light beam LB is interrupted or only to flex slightly. A slight flexing of the membrane 16 moves the elongated portion 16*a* only a short distance, making the switch 10 very sensitive. In other words, only a slight pressure increase in the passageway 18 and the branch passageway 18*a* will cause the elongated portion 16*a* to interrupt the light beam LB.

The housing components 30 and 32 are fixedly connected together after calibration. This may be accomplished by applying to adjacent exterior portions of the housing components 30 and 32 an adhesive after adjusting the relative positions of these components. A silicone type of adhesive may be used, which may be removable, to allow re-calibration. A suitable adhesive is sold by Dow-Corning under the identifying number 832.

FIG. 8

Figure 8:
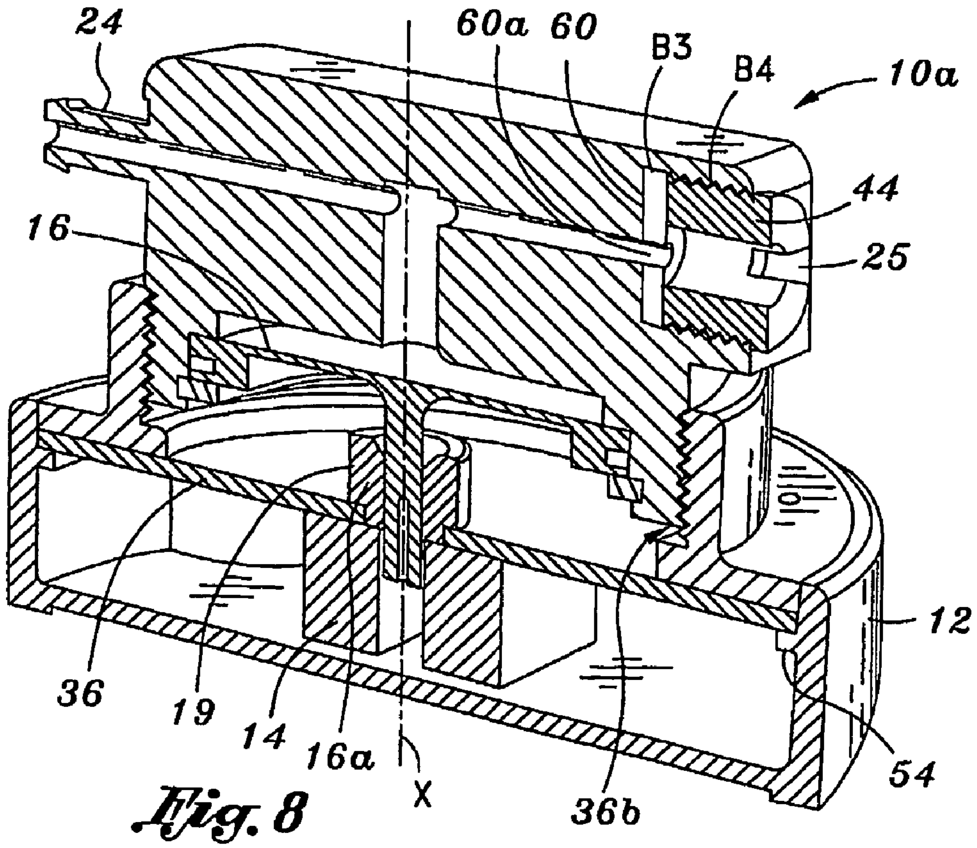
FIG. 8 is a cross-sectional view of an alternate embodiment of the optical pressure switch of this invention.

An alternate embodiment of the switch of this invention is generally designed by the numeral 10*a* in FIG. 8. This switch 10*a* is essentially identical to the switch 10, except an orifice plate 60 with a central aperture 60*a* therein is used instead of the porous flow control member 42. Typically, the aperture 60*a* has a diameter substantially from 0.008 to 0.016 inches. The orifice plate 60 is seated in the bore B4 on a ledge between the bores B3 (shallower than in the switch 10) and B4 and the aperture 60*a* is aligned with the outlet 25 provided in the threaded tubular cap 44. The cap 44 is screwed in position to hold the plate 60 in position in the bore B3.

FIG. 9

Figure 9:
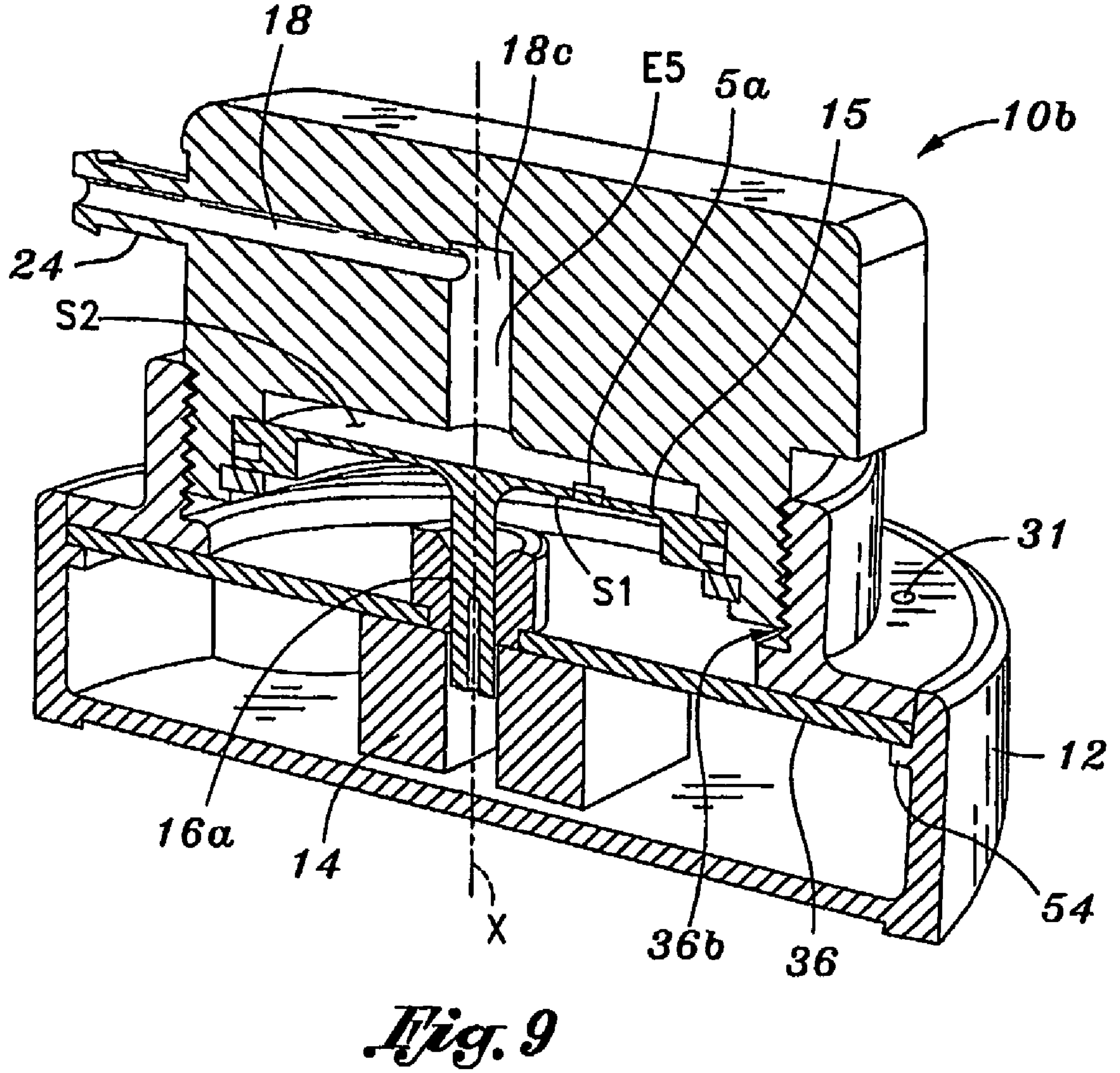
FIG. 9 is a cross-sectional view of another alternate embodiment of the optical pressure switch of this invention.

Another alternate embodiment of the switch of this invention is generally designed by the numeral 10*b* in FIG. 9. The optical pressure switch 10*b* uses a membrane 15 that includes a tiny orifice 15*a* therein to establish initially ambient pressure on each side S1 and S2 of the membrane 15. The passageway 18 is also different in that it has a generally L-shape, with its one leg 18*c* having an outlet end E5 terminating adjacent the side S2 of the membrane 15. This end E5 serves as the only outlet of the passageway 15. In the switch 10, there are in effect two outlets: the outlet 25 provided in the threaded tubular cap 44 and the end E3 in the branched passageway 18*a*. In both the switches 10 and 10*a*, a back pressure, respectively provided by the flow control member 42 and the orifice plate 60, is sufficient so that most of the pressurized gas flows through the branched passageway 18*a* to flex the membrane 16. In the switch 10*b*, there is only a single outlet, namely, the end E5 in the one leg 18*c*.

In all the embodiments, the pressurized gas flowing into the optical pressure switches 10, 10*a*, and 10*b* is above ambient pressure and is a transitory phenomenon occurring only momentarily when the pneumatic sensing edge 22*a* makes initial contact with an object. The switches 10, 10*a*, and 10*b*, each essentially immediately provides the control signal CS on contact of the edge 22*a* with an object so the door 22 is opened automatically. Thus, the door 22 and object disengage to discontinue forcing gas at an elevated pressure to flow into the operable switch 10, 10*a*, or 10*b*, as the case may be. Because of the openings 31 in the rim 30*b* of the housing component, the inner portion of the cut-a-away sections 36*b* creating access openings in the circuit board 36, and the outlet 25 placing the chambers C1, C2 and C3 in fluid communication with the atmosphere, both sides S1 and S2 of the membrane 16 are initially subjected to ambient pressure and are again, essentially immediately, subjected to ambient pressure when the pressure wave dissipates, returning the membrane 16 to its normal un-flexed, equilibrated condition.

Because of the tiny orifice 15*a* in the membrane 15 both its sides S1 and S2 are initially at ambient pressure. The diameter of the orifice 15*a* only about 0.012 inch. Consequently, a pressure wave entering the switch 10 still flexes the membrane 15 since only a very small faction of pressurized gas is forced through the tiny orifice 15*a*. As soon as pressure wave dissipates, the membrane 15 returns to its normal un-flexed condition.

Diagnostic Method

The optical pressure switch 10 has the ability for self-annunciation for purposes of diagnosing or testing its operability. This is achieved by the means of the light indicators LED R and LED G. For example, the indicator LED R, when lit, is indicating that the switch 10 is electrically connected to a 12V or 24V power source P.S. (FIGS. 1A and 1B) from an electrical system of, for example, a vehicle such as a bus employing the doors 22. The indicator LED G, when lit, is indicating that the switch 10 has been activated by the pneumatic sensing edge 22*a* making contact with an object as the door is being closed. This illuminated indicator LED G provides to, for example, a technician trouble shooting a visual "Door Obstruction" signal. A typical diagnostic test procedure is as follows:

1. Open an access panel over the door opening to access a compartment holding the switch 10.
2. Activate the vehicle's run/key switch to provide power to the vehicle's onboard electronics including the switch 10.
3. Visually check the indicator LED R to confirm it is lit.
   An illuminated indicator LED R shows that the switch 10 is connected to the vehicle's wiring and that power and ground is present. This will eliminate further diagnosing of the vehicle's power circuit to the switch 10 and the technician may proceed to Step 4 below.
   If the indicator LED R is OFF (not illuminated), this is an indication that:
   1. There is a problem with vehicle's wiring to the switch 10, or.
   2. There is a problem with the vehicle's power circuit, or.
   3. The switch 10 has failed There is no need to further diagnose the rest of the components that comprise of the door operating system 20 until this problem is resolved. This will eliminate unnecessary troubleshooting of the remaining components such as the pneumatic sensing edge 22*a* and the hose 22*b* connected to the inlet 24.

4. Observe the indicator LED G: While observing the indicator LED G, the technician conducts a test using his or her hand to squeeze and hold the pneumatic sensing edge 22*a*. The indicator LED G should be illuminated each time the technician squeezes the pneumatic sensing edge 22*a* and go out after releasing this pneumatic sensing edge. If the technician squeezes the pneumatic sensing edge 22*a* and holds it, the indicator LED G will go out within a short time interval, for example about 30 seconds, because the air pressure in the chambers C1 and C2 equalizes.

The illumination of the indicator LED G when the pneumatic sensing edge 22*a* is squeezed and held by the technician is an indication that the switch 10 is operating correctly and that it is receiving a signal from the logic circuit LC, indicating that the pneumatic sensing edge 22*a* and the switch are working properly. If the indicator LED G does not light up at all when the technician squeezes and holds the pneumatic sensing edge 22*a*, this is an indication that there may be a problem with the door edge 22*a* and that it is not sending a pressure pulse wave to the switch 10. It would then be necessary to troubleshoot the door edge 22*a* or the hose 22*b* connecting the edge to the switch 10. If the indicator LED G does not go out after the technician squeezes and holds the pneumatic sensing edge 22*a*, this is an indication that the switch 10 is plugged and the pressure on the opposite sides S1 and S2 of the membrane 16 is not equalizing. If this cannot be remedied then the switch 10 should be replaced or repaired.

Some Advantages of this Invention

The stem 16*a* replaces metallic contacts and improves the switch's operating characteristics when subjected to shock and vibration. This is because the stem 16*a* is lighter in weight than metallic contacts. In addition, the stem 16*a* is less affected by its mounting orientation, vertically or horizontal or otherwise. The prior art mechanical switch requires pressure between the two metallic contacts for the necessary electrical continuity. This makes calibration more difficult. This is not the case with the switches 10, 10*a* or 10*b*. Calibration adjustments of these switches are much easier to make and they also has the capability of working at a very low air pressure (down to 2 millimeters of water column, or 0.003 psi). The switch 10 may use the porous flow control member 42 for an ambient air orifice which acts as a filter. Removing the cap 44 allows for replacement of the flow control member 42 if it becomes contaminated. This is a cost savings to the vehicle operators. The calibration adjustment allows for a visual tamper proof indicator, because the removal of the adhesive from the exterior of the housing components 30 and 32 is readily observable. This feature is desired by the vehicle manufactures to insure that unauthorized individuals have not changed the pressure setting.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. An optical pressure switch comprising a body including a passageway having an outlet and an inlet into which flows a gas at a pressure above ambient pressure, an optically activated control device having a light beam projected along an optical path within said body, and an elastic membrane within the body including a first side in communication with the passageway and a second side having an elongated portion that moves a predetermined distance into the optical path when the membrane flexes, said first and second sides of the membrane each normally being at ambient pressure so the membrane is in an un-flexed condition prior to the pressurized gas flowing into the passageway through the inlet and, in response to said pressurized gas flowing into the passageway, flexing the membrane to move the elongated portion said predetermined distance, with the membrane returning to the un-flexed condition as the gas escapes through the outlet.

2. An optical pressure switch comprising a body including a first chamber and a second chamber, an elastic membrane providing a common wall between the chambers and flexing when there is a differential in pressure across the membrane, the first chamber including a port normally in communication with ambient pressure and adapted to be placed in communication with a pressure wave above ambient pressure that momentarily flows through the first chamber, the second chamber including an optically activated control device having a light beam projected along an optical path within said second chamber, said membrane having a portion that interrupts the light beam so an electronic signal is generated upon flexing of the membrane, said second chamber being open to ambient pressure through a restricted opening that substantially reduces contamination of the optically activated control device that would interfere with the functioning of the light beam.

3. The optical pressure switch of claim 2 where the second chamber encloses essentially the entire optically activated control device.

4. An optical pressure switch comprising a body including a passageway having an inlet end and an outlet end and through which a pressurized gas flows between the inlet and outlet ends, a control circuit including an optically activated control device where a light beam is projected along an optical path within said body, a first light-emitting device that indicates when power is applied to the circuit, and a second light-emitting device that indicates when pressurized gas flows into the passageway, and a flexible and resilient membrane positioned within the body and including a first side in communication with the passageway and a second side having an elongated portion that moves a predetermined distance into the optical path when the membrane flexes in response to a predetermined pressure of said pressurized gas, said body having an opening therein accessing ambient pressure so the membrane is initially subjected to ambient pressure on each side of the membrane prior to the pressurized gas flowing into the passageway and a first chamber and a second chamber with the membrane providing a common wall for the chambers, said passageway being in the first chamber and said elongated portion extending into the second chamber, said body including two components with the membrane being attached to one of said components, said components having been moved relative to each other to adjust said predetermined distance to thereby calibrate the pressure switch, said components being fixedly connected after calibration.

5. An optical pressure switch comprising a body having a longitudinal reference line and including a first housing component including a threaded surface, a second housing component including a threaded surface and a passageway having an inlet end and an outlet end and through which a pressurized gas flows into the inlet end through the passageway and out the outlet end, and a third housing component including an optically activated control device where a light beam is projected along an optical path within said third housing, said optical path intersecting the longitudinal reference line, said first housing component being disposed between the second and third housing components, a flexible and resilient circular disk membrane having a circular perimeter and a center which the longitudinal reference line intersects, said disk membrane positioned between said first and second housing components to form within the first housing component a first chamber and within the second housing component a second chamber with the membrane providing a common wall for the chambers, said membrane including a first side in communication with the passageway and a second side having an elongated portion extending from said center of the disk membrane along said longitudinal reference line, said elongated portion moving a predetermined distance into the optical path when the membrane flexes in response to a predetermined pressure of said pressurized gas, said second side being substantially at a right angle to the longitudinal reference line prior to the membrane flexing, and said membrane initially being in communication with ambient pressure on each side of the membrane prior to the pressurized gas flowing into the passageway, said membrane being attached to one of said housing components having a threaded surface, said threaded housing components having been moved relative to each other by engaging the threaded surfaces to adjust said predetermined distance to thereby calibrate the pressure switch, said first and second housing components being fixedly connected after calibration.

6. The optical pressure switch of claim 5 including a control circuit having a first light-emitting device mounted to the body that indicates when power is applied to the circuit and a second light-emitting device mounted to the body that indicates when pressurized gas flows into the passageway.

7. The optical pressure switch of claim 5 where the membrane comprises a substantially flat, planar, circular and elastic member having a perimeter in a fixed position and the elongated portion comprises a centrally located stem extending outward from said second side of the membrane substantially at a right angle to said second side prior to said membrane flexing.

8. The optical pressure switch of claim 7 where the passageway includes a flow control member at or near the outlet end that impedes gas flow through the passageway.

9. An optical pressure switch comprising a body including first and second chambers with a flexible elastic diaphragm providing a common wall for the chambers, said first chamber providing a passageway having an outlet and an inlet into which flows a pressurized gas at a pressure above ambient pressure, and said second chamber providing an enclosure for optical elements of an optically activated control device that projects a light beam along an optical path within said second chamber, said elastic diaphragm having a central portion, a perimeter in a fixed position, a first side in communication with the passageway and a second side having an elongated stem element projecting outward therefrom into the second chamber that moves a predetermined distance into the optical path when the diaphragm flexes, an accessing opening enabling both sides of the diaphragm to be initially subjected to ambient pressure prior to pressurized gas flowing into the passageway, and a flow control member at or near the outlet of the passageway that impedes gas flow through the passageway so back pressure is created within the passageway when a pressure wave enters the passageway.

10. The optical pressure switch of claim 9 where the flow control member comprises a porous plug.

11. The optical pressure switch of claim 9 where the flow control member comprises a plate with an aperture therein.

12. The optical pressure switch of claim 9 where the diaphragm includes a tiny orifice therein to establish ambient pressure on each side of the membrane.

13. The optical pressure switch of claim 9 where the second chamber is open to ambient pressure through a restricted opening that prevents substantial contamination of the optical elements.

14. The optical pressure switch of claim 9 where said chambers are connected together in a manner that enables one chamber to be moved relative to the other chamber to adjust said predetermined distance, enabling the pressure switch to be calibrated, said chambers being fixedly connected together after calibration.

15. The optical pressure switch of claim 9 including a first light-emitting device that indicates when power is applied to the circuit, and a second light-emitting device that indicates when pressurized gas flows into the passageway.

* * * * *